May 12, 1953 F. A. BEACHLER 2,638,352
FIFTH WHEEL COUPLING
Filed Sept. 7, 1950 2 Sheets-Sheet 1
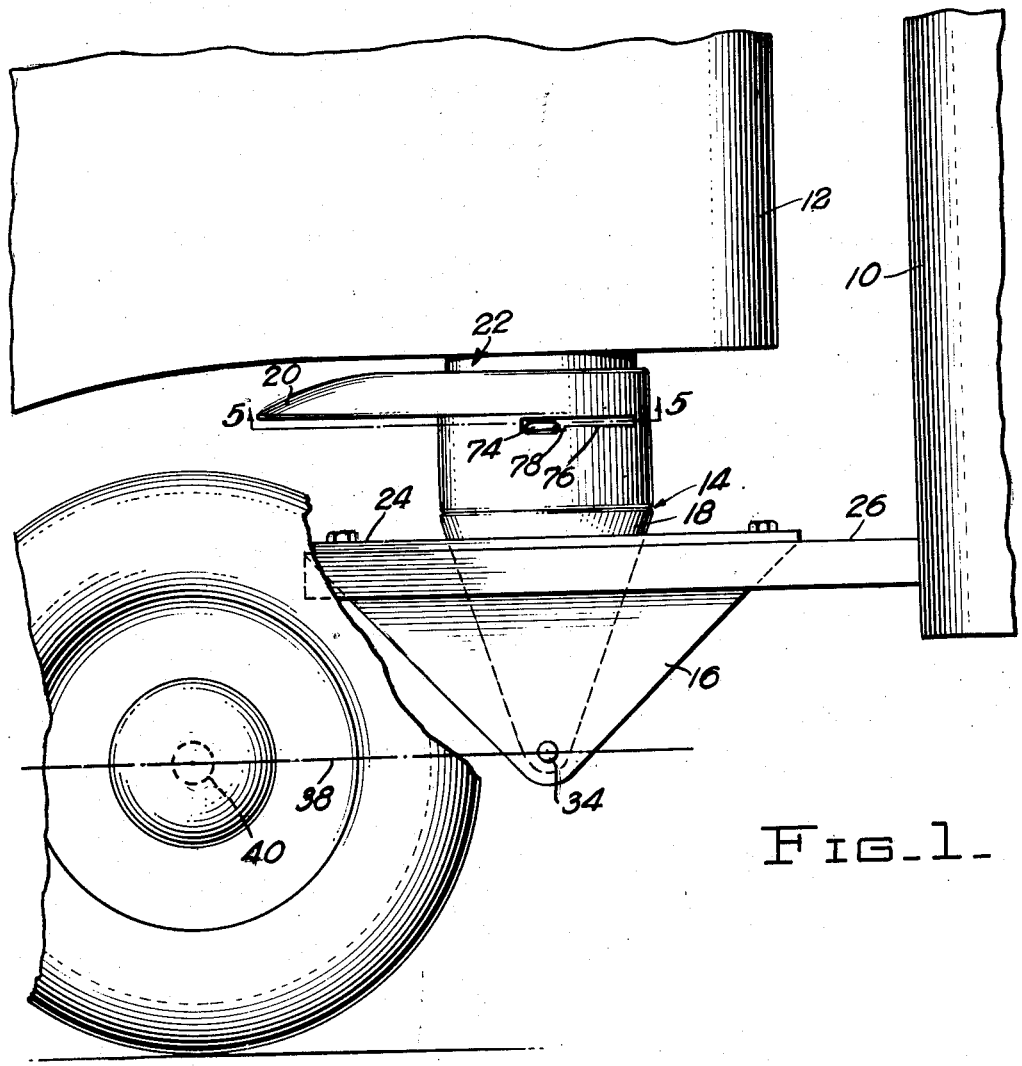
Fig_1_
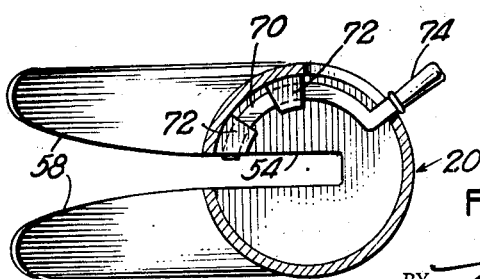
Fig_5_
INVENTOR
FORREST A. BEACHLER
BY Raymond Wootten
ATTORNEY

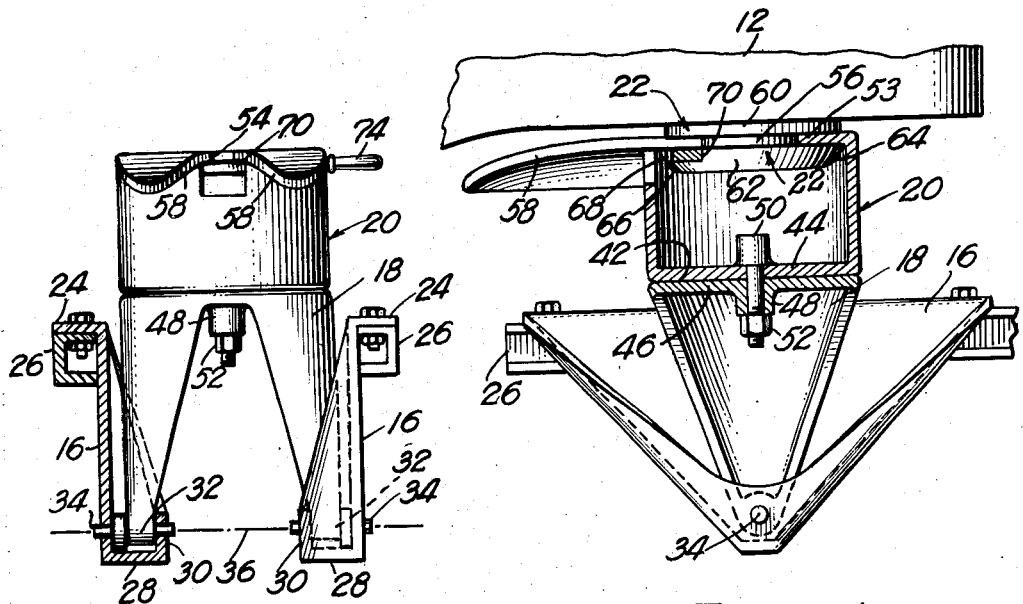
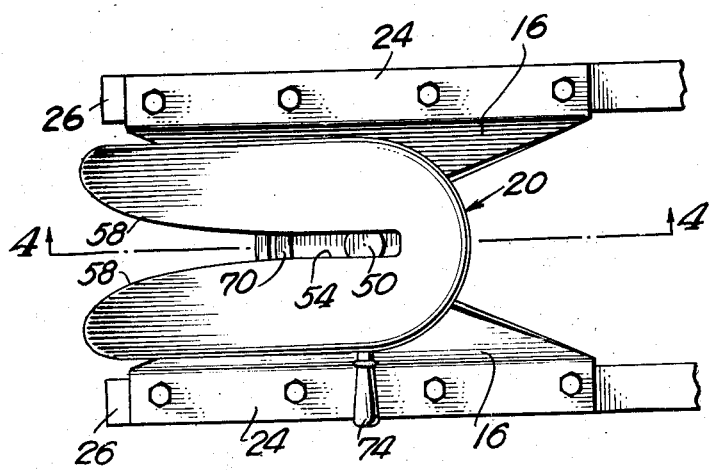

Patented May 12, 1953

2,638,352

UNITED STATES PATENT OFFICE 2,638,352

FIFTH WHEEL COUPLING

Forrest A. Beachler, Bicknell, Ind.

Application September 7, 1950, Serial No. 183,513

6 Claims. (Cl. 280—33.05)

This invention relates to couplings of the fifth wheel type primarily intended for the articulation of tractors and semi-trailers.

Couplings of the conventional types for the purpose have not been satisfactory, in that they subject the trailers to buckling effects, particularly when traveling over rough roads, and tend to raise the front wheels of the tractor from the road under starting conditions.

It is among the objects of the present invention to overcome these faults of prior constructions, with a view towards increasing the pulling capacity of tractors and providing such improved operation of such vehicle trains as will reduce their operating and maintenance costs appreciably.

The invention contemplates the combination with a tractor having a rear axle and a frame supported thereby, a trailer coupling comprising a saddle secured to the tractor frame, a member pivotally connected to the saddle for rocking motion fore-and-aft of the tractor on an axis located forwardly of and in substantially the horizontal plane of the axle, and a slotted fifth wheel connected to the member for pivotal movement about a vertical axis. The axis about which the rocking member is pivotally connected to the saddle preferably extends transversely of the tractor frame, parallel with the axis of the rear axle. The saddle is appropriately composed of a pair of members respectively secured to opposite sides of the tractor frame and the rocking member is pivotally connected thereto at spaced points.

The fifth wheel is preferably divergently slotted to receive a coupling element carried by the trailer, and a bolt or latch carried by the fifth wheel is readily adjustable by an operator to open the slot for reception of the trailer coupling element or to close the slot for retention of the coupling element.

Various other objects will be evident from a detailed description of the example of the invention illustrated in the accompanying drawings wherein:

Fig. 1 is a fragmentary elevation depicting a coupling in accordance with the present invention interposed between a tractor and trailer;

Fig. 2 is an elevation of the coupling looking from the rear of the tractor with the trailer removed;

Fig. 3 is a plan view, partially broken away, of the coupling depicted in Fig. 2;

Fig. 4 is a sectional elevational taken along line 4—4 of Fig. 3; and

Fig. 5 is a section taken along line 5—5 of Fig. 1, partially broken away, illustrating the latch arrangement.

As clearly shown in the drawings, the tractor 10 is coupled with a semi-trailer 12 by means of a coupling 14. The coupling includes saddle members 16, a fore-and-aft rocking member 18 pivotally connected to the saddle members, a fifth wheel 20 pivotally carried by the rocking member, and a trailer-carried coupling element 22. The upper ends of the saddle members 16 are formed with horizontally disposed flanges 24 superimposed upon the upper flanges of the tractor frame channels 26, the lower ends of the saddle members being turned inwardly towards one another to define horizontal flanges 28, and upwardly to define vertical flanges 30. Thus a channel formation is defined at the lower end of each saddle member. These channel portions receive the reduced lower ends 32 of the fore-and-aft rocking member 18 which are pivotally supported therein by means of transversely disposed pins 34 or the like. Upon reference to Fig. 2 of the drawings, it will be evident that the pivot pins have a common transverse axis 36 lying in a horizontal plane 38 in which the axis of the rear axle 40 also lies.

The rocking member 18 provides a substantially plane upper surface 42 to serve as a bearing for the lower wall 44 of the fifth wheel 20. The upper wall 46 of the rocking member has a downwardly directed sleeve 48 affixed to its lower surface to receive the shank of a bolt 50 which penetrates the lower wall of the fifth wheel and the upper wall of the rocking member, the bolt serving as a pivot for rotation of the fifth wheel about a vertical axis. The bolt is suitably secured in its operative position by means of a nut 52 and any suitable form of locking means, not shown.

The upper wall 53 of the fifth wheel contains an elongated slot 54 for the reception of a trailer-carried coupling element 56, the slot 54 being closed forwardly and opening rearwardly of the tractor, as viewed in the drawings, with divergent edges 58. Thus, as depicted in Fig. 3, the upper surface of the fifth wheel contains a slot cooperable with the trailer-carried coupling element to produce a self centering effect during a coupling operation. The rearwardly disposed divergent portions of the fifth wheel are curved downwardly, as shown in Fig. 4, to define a ramp to facilitate coupling and uncoupling of trailers and tractors.

The trailer-carried coupling element comprises a plate 60 suitably secured to the trailer and a depending bar 62 having a forwardly directed projection 64 having an upper surface for engagement with the undersurface of the upper wall 52 of the fifth wheel, and a rearwardly directed projection 66 defining a horizontal slot 68 for the reception of a curvilinear bolt or latching member 70 supported in guides 72 arranged on the undersurface of the upper wall 52 of the fifth wheel. An actuating handle 74 for the bolt 70 extends through a slot 76 formed in the fifth wheel, where it is readily accessible to the operator. The slot 76 is provided with a depressed portion 78 into which the handle is moved when the bolt is thrown to retain the members in coupled relationship. When it is desired to uncouple the tractor from the trailer, it is merely necessary to elevate the handle 74 out of the depression 78 and move it to the opposite end of the slot 76, whereupon the bolt 70 clears the slot 54 permitting separation of the coupling portions.

Since various modifications of this invention will suggest themselves to those skilled in the art, just as they have already occurred to the present inventor, the invention should not be restricted to the form illustrated beyond the scope of the appended claims.

I claim:

1. In combination with a tractor having a rear axle and a frame supported thereby, a trailer coupling comprising a saddle secured to said frame, a member pivotally connected to said saddle on an axis located forwardly of and substantially parallel to said axle and in substantially the horizontl plane thereof, and a slotted fifth wheel pivotally connected to said member for movement about a vertical axis.

2. In combination with a tractor having a rear axle and a frame supported thereby, a trailer coupling comprising a saddle secured to said frame, a member pivotally connected to said saddle on a transverse axis located forwardly of said axle and in the horizontal plane thereof, and a slotted fifth wheel pivotally connected to said member for movement about a vertical axis.

3. In combination with a tractor having a rear axle and a frame supported thereby, a trailer coupling comprising a saddle secured to said frame, a member pivotally connected to said saddle on a transverse axis located forwardly of said axle and in substantially the horizontal plane thereof, a slotted fifth wheel pivotally connected to said member for movement about a vertical axis, and a bolt carried by said fifth wheel for retention of a trailer fitting therein.

4. In combination with a tractor having a rear axle and a frame supported thereby, a trailer coupling comprising saddle members secured to opposite sides of said frame, a member pivotally connected to said saddle members at spaced points on a transverse axis located forwardly of said axle and in substantially the horizontal plane thereof, and a slotted fifth wheel pivotally connected to the first said member for movement about a vertical axis.

5. In combination with a tractor having a rear axle and a frame supported thereby, a trailer coupling comprising a saddle secured to said frame, a member pivotally connected to said saddle on a transverse axis located forwardly of said axle and in the horizontal plane thereof, and a divergently slotted fifth wheel rotatably connected to said member for movement about a vertical axis.

6. In combination with a tractor having a rear axle and a frame supported thereby, a trailer coupling comprising a pair of saddle members secured to said frame and depending therefrom, a member pivotally connected to depending portions of said saddle members on a transverse axis located forwardly of said axle and in substantially the horizontal plane thereof, and a slotted fifth wheel pivotally connected to the first said member for movement about a vertical axis.

FORREST A. BEACHLER.

References Cited in the file of this patent

UNITED STATES PATENTS

| Number | Name | Date |
| --- | --- | --- |
| 2,187,970 | Greer | Jan. 23, 1940 |
| 2,442,914 | Apgar | June 8, 1948 |

FOREIGN PATENTS

| Number | Country | Date |
| --- | --- | --- |
| 22,872 | Great Britain | Dec. 12, 1902 |

OTHER REFERENCES

Commercial Car Journal, pp. 22, 23, 24 and 25, July 1941.